March 1, 1955 R. C. DREIER 2,702,947
SPIRIT LEVEL
Filed April 28, 1951
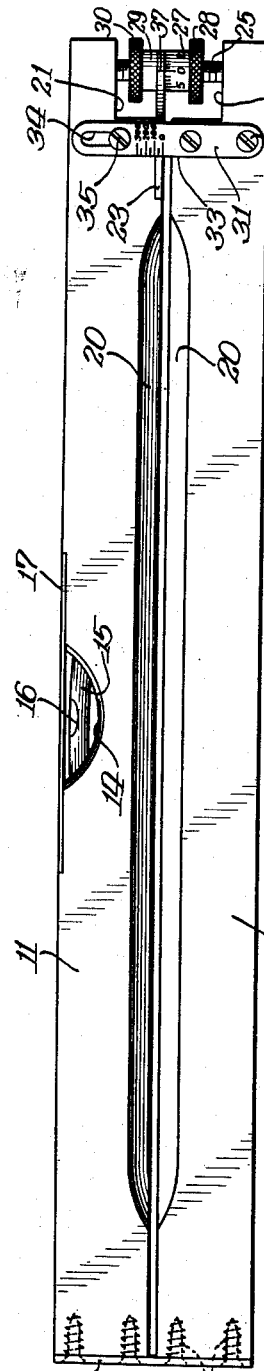
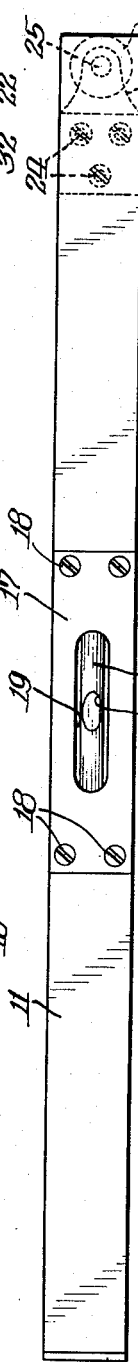
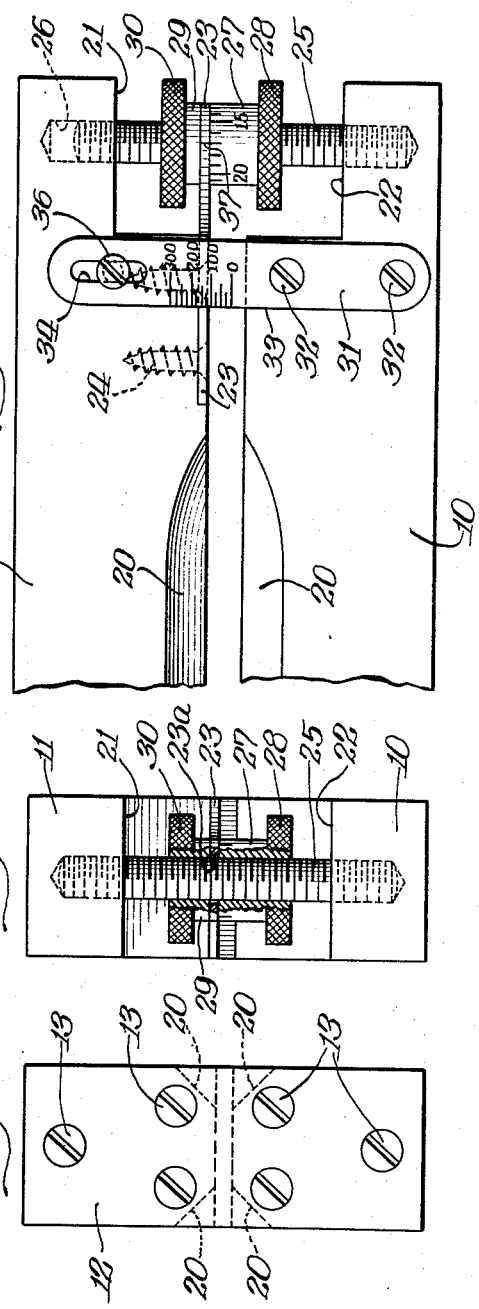
INVENTOR.
Raymond C. Dreier,
BY
Smith, Olsen & Baird
Attys.

United States Patent Office 2,702,947
Patented Mar. 1, 1955

2,702,947

SPIRIT LEVEL

Raymond C. Dreier, Shawano, Wis., assignor, by mesne assignments, to Dreier Brothers, Inc., Chicago, Ill., a corporation of Illinois Application April 28, 1951, Serial No. 223,627

1 Claim. (Cl. 33—214)

The present invention relates to spirit levels and more particularly to an adjustable spirit level assembly especially useful in the positioning of pipes, conduits, and other bodies at a predetermined declination with respect to the horizontal.

In certain types of construction work, and particularly in plumbing and related occupations, it is very often necessary to lay pipes and conduits of very considerable length in such a way that the piping throughout its length will have a uniform rate of fall or a uniform pitch with respect to the horizontal, this being necessary in order that the liquid contents in all parts of the piping will tend always to be moved by gravity in one direction at a uniform rate. Circumstances very often arise in such work wherein the piping may be on the order of several hundred feet, or even a thousand feet in length while the total fall or drop permitted for the entire length may be only a few inches. Such piping installations may be, and ordinarily are, made up of a number of joined sections which may include elbows or bends and the piping sometimes must extend through various obstacles such as the interior or exterior walls of a building which make it impossible to sight along the piping in order to establish the desired declination or to insure that the pitch or fall is uniform throughout the length of the piping. Ordinarily, too, there is no horizontal surface available which would serve as a common reference plane from which actual vertical measurements can be taken to establish the desired uniform pitch of the piping.

These problems almost universally arise in the construction of water and sewage systems in buildings and in the construction of sewers, stationary boilers and the like. Closely related problems many times also arise in the construction of ships and large aircraft as well as in the construction of gravity operated conveyors and other structures. In the case of ships, a large percentage of the liquid conveying conduits and such items as deck plates, bulkheads and the like are often secured in the hull while the hull is disposed on inclined launching ways. In the case of large aircraft, major portions are assembled and often installed in the air frame while the air frame is disposed in some position other than the position it will later occupy in horizontal flight. In either case, there are numerous conduits, bulkheads, deck plates and other parts often installed during the earlier phases of construction which are intended to occupy a horizontal position or have a predetermined declination with respect to the horizontal when the ship is later afloat or the aircraft is later in normal horizontal flight. The practical difficulties involved in placing these parts in ships and aircraft so that they will later occupy their desired positions with respect to the horizontal are readily understandable, for in many instances there is no physical body available within the ship's hull or the interior of an aircraft to serve as a common horizontal or inclined reference plane from which actual lineal measurements can be made to properly position the parts with respect to the horizontal.

One of the important objects of the present invention is the provision of a very accurate but rugged and comparatively inexpensive adjustable spirit level ideally adapted for use by workmen in overcoming the problems described above. In its preferred form the spirit level comprises a pair of arms disposed longitudinally one above the other with an end of one of the arms pivotally mounted upon the adjacent end portion of the other arm so that the free ends of the arms may be adjustably separated to vary the angular relationship between the two. A bubble level is carried by one of the arms and it will be understood that when the two arms have been pivotally arranged at a known predetermined angle with respect to each other, the instrument may be employed to assist in the positioning of pipes, conduits, bulkheads or other bodies at that predetermined angle with respect to the horizontal. Thus, if a long length of piping must have a uniform fall or pitch with respect to the horizontal, the spirit level of the present invention may be suitably adjusted to correspond to that pitch and may then be used in conjunction with each of the sections making up the length of piping to insure that each section lies at its proper angle with respect to the horizontal, the result being that the pitch of the installed piping may easily be made accurate and uniform throughout its length despite the fact that the piping may include elbows and bends and may pass through various obstacles such as walls and the like. Similarly, if a ship or aircraft under construction is resting upon ways or mounts at a known angle with respect to the horizontal, the spirit level of the present invention may be suitably adjusted to correspond to that angle and may thereupon be used accurately to position deck plates and other bodies within the ship or aircraft which must be disposed in a true horizontal position or at some other predetermined angle with respect to the horizontal when the ship is later afloat or the aircraft is later in normal horizontal flight.

Accuracy, durability and simplicity are extremely important in an adjustable spirit level of the aforesaid kind, for in many instances the angles to be dealt with are very small and the instrument will likely be subjected to rough treatment. Accordingly, it is an object of the present invention to provide an adjustable spirit level having improved means for pivotally securing its two arms together, said means being simple and rugged and avoiding entirely the use of pivot pins and the like which through wear and rough treatment would introduce inaccuracies into the instrument. A further object of the invention is the provision of resilient means for securing the two arms together tending to maintain the arms in parallel relationship but permitting the free ends of the arms to be separated. Another object of the invention is to provide in the spirit level improved and resilient adjusting means for separating the free ends of the arms to a predetermined degree indicated on the spirit level in terms of thousandths of an inch pitch or drop per foot of length or run.

These and other objects and advantages of the invention will be apparent from the following description of a preferred embodiment thereof, taken in connection with the accompanying drawing in which:

Fig. 1 is an elevational view of a spirit level embodying the present invention;

Fig. 2 is a top plan view of the spirit level;

Fig. 3 is an end view of the spirit level as seen from the left of Fig. 1;

Fig. 4 is an enlarged view of the right-hand end of the level as seen in Fig. 1, certain parts being cut away for clearness of illustration; and Fig. 5 is an enlarged fragmentary elevational view of the right-hand portion of the level as seen in Fig. 1, showing the adjusting mechanism in detail.

In the embodiment of the invention shown in the drawing the spirit level is comprised of a lower arm 10 and an upper arm 11, each having in general the same configuration and being disposed longitudinally one above the other. The two arms may be formed of wood or other suitable material and are joined together at their adjacent ends in spaced relationship by a resilient metal plate 12 fixedly secured to the ends of the arms 10 and 11 as by a plurality of screws 13. As shown in the drawing the arms are substantially rectangular in transverse cross-section and have longitudinal axes lying in a common plane. The upper arm 11 has formed in its uppermost central portion an arcuate depression 14 in which is mounted a slightly arcuate spirit tube or bubble level 15 substantially filled with a suitable liquid and having an air bubble 16 therein, as in the case of ordinary and well known spirit tubes. A guard plate 17 having an opening 18 is mounted upon the top surface of the upper arm 11 as by a plurality of screws 18 in order to protect the bubble level 15 from damage, the bubble level and the bubble 16 in the fluid therein being observable from the top of the spirit level through the opening 18 in the guard plate 17 or from either side of the spirit level as illustrated in Fig. 1. The two lower longitudinal edges of the upper arm 11 and the two upper longitudinal edges of the lower arm 10 may be grooved as at 20 to receive the fingers of an operator in order to make manipulation and handling of the spirit level convenient.

The lower portion of the upper arm 11 is cut away at the right-hand or free end of the arm as seen in Fig. 1 to provide a notch or recess 21, and the upper portion of the lower arm 10 is similarly cut away at its right-hand or free end to provide a corresponding opposed notch or recess 22. Upon the lower side of the upper arm 11, at its right-hand end as viewed in Fig. 1, a resilient and slightly flexible metal tongue 23 is mounted as by screws 24 flush with the lower surface of the arm, the tongue 23 extending longitudinally outwardly into the space provided by the notches or recesses 21 and 22. The advantage derived from the resilient nature of the tongue is explained below. An opening 23a (Fig. 4) is provided in the tongue adjacent its outer extremity for loosely receiving a threaded stud 25 which is fixedly mounted in an upright position on the lower arm 10 in the lower surface of the recess 22 and at right angles to the longitudinal axis of the lower arm 10. The threaded stud 25 extends upwardly from the lower surface of the recess 22, a recess 26 being provided in the upper arm 11 very loosely to receive the upper extremity of the stud. A circular adjusting nut 27 is threadedly mounted upon the stud 25 beneath the tongue 23 and is provided on its lower side with a circular shoulder 28 which may be knurled to permit the nut to be readily turned on the stud 25 by the fingers. A circular locknut 29 of similar configuration is threaded upon the stud 25 above the tongue 23 and is provided with a circular shoulder 30 which, like the shoulder 28 on the nut 27, may be knurled to permit convenient manipulation with the fingers.

A gauge plate 31 is mounted in an upright position on the front side of the lower arm 10 adjacent its recess 22 as by a plurality of screws 32. This gauge plate, like the tongue 23, may be fabricated of cold rolled steel or the like, preferably cadmium plated, and is provided with a straight longitudinal lateral edge 33 which extends upwardly alongside the lateral edge of the tongue 23 and the side of the upper arm 11, and at right angles to the longitudinal axis of the lower arm 10. The upper portion of the gauge plate is provided with a longitudinal slot 34 which is slidably received by a guide pin 35 firmly fixed on the front surface of the upper arm 11 as best seen in Figs. 1 and 5. If desired, the guide pin 35 may consist of a screw having a head overlying the outer surface of the gauge plate to prevent the gauge plate from being accidentally sprung or bent outwardly away from the side of the upper arm 11.

The resilient end plate 12 is preferably planar in form and the end surfaces of the arms 10 and 11 secured to the plate 12 are normal to the longitudinal axes of the arms. The plate 12 therefore tends to maintain the two arms 10 and 11 in perfect parallel relationship, in which condition the flat, planar lower surface of the lower arm 10 is parallel to the flat, planar upper surface of the upper arm 11 in which the bubble level 15 is mounted in the recess 14. When the arms are in this parallel condition, the lower edge of the tongue 23 is disposed opposite a "zero" mark provided on the straight edge 33 of the gauge plate 31. Similarly, with the arms 10 and 11 disposed in their parallel position and with the adjusting nut 27 moved upwardly against the lower side of the tongue 23, as shown in Fig. 1, a "zero" mark on the adjusting nut will be disposed opposite an index mark 37 which is etched or otherwise impressed vertically on the side of the tongue directly opposite the axis of the upstanding stud 25. By loosening or raising the lock nut 29 and thereupon revolving the adjusting nut 27 on the threaded stud, it will be seen that the tongue 23 will be raised with respect to the lower arm 10 to separate the free ends of the arms and thus change the angular relationship between the arms. In this operation the resilient plate 12 is flexed in its area between the ends of the arms 10 and 11 and the arms thus pivoted about their left ends as seen in Fig. 1.

The present spirit level is graduated so as to show the angular relationship between its arms in terms of thousandths of an inch drop or pitch per foot of length or run, this being a kind of unit graduation particularly useful to plumbers who ordinarily measure the pitch of pipes and conduits in such terms with respect to the horizontal. To this end the circumference of the adjusting nut 27 is provided with twenty-five equally spaced graduations, each of which indicates an angular change in the relationship of the arms 10 and 11 equal to one one-thousandth of an inch drop or pitch per foot of length or run. The gauge plate 31 is also provided with a plurality of equally spaced graduations, each so spaced that the lower edge of the tongue 23 will move from one graduation to a position opposite the next adjacent graduation on the gauge plate upon one complete revolution of the adjusting nut 27. It will thus be understood that the graduations on the gauge plate provide a principal scale graduated in increments indicating twenty-five thousandths of an inch drop or pitch per foot of length, while those on the adjusting nut provide a secondary scale for making fine adjustments in units of one one-thousandth of an inch drop or pitch per foot of length or run.

In order that one complete revolution of the adjusting nut 27 will actually change the angular relationship between the arms an amount equal to 25 thousandths of an inch per foot of length, as indicated by the graduations on the nut and on the gauge plate, it is absolutely essential that the length of the arm 10 as measured from the plate 12 to the axis of the stud 25 bear a certain relationship to the pitch of the uniform threads on the stud. If the pitch of the threads on the stud 25 were actually 0.25 inch, the adjusting nut 27 would be raised or lowered 25 thousandths of an inch upon each complete revolution of the nut on the stud and, if the graduations on the adjusting nut and plate 31 were to indicate accurately the angle between the arms 10 and 11 in terms of thousandths of an inch of pitch or fall per foot of length or run, the length of the arm 10 would necessarily have to be exactly one foot or 12 inches in length as measured from the resilient end plate 12 to the axis of the stud 25. The spirit level can be constructed to larger dimensions, however, so long as this proportional relationship between the pitch of the threads on the stud and the length of the arms is maintained. For example, a convenient size for the spirit level has been found to be produced when a stud 25 is employed which is 5/16 inch in diameter and has a 24 N. F. class 3 thread. Such threads have a pitch of .0416 inch and the length of the arms 10, as measured from the plate 12 to the axis of the stud 25 must be equal to $$\frac{12 \times .0416}{.025}$$

or 20 inches.

The space between the graduations on the gauge plate 31 must also bear a certain relationship to the pitch of the screw if those graduations are to indicate accurately the angular relationship between the arms 10 and 11 in terms of thousandths of an inch of pitch or drop per foot of length. The spaces between these graduations must equal the pitch of the threads on the stud 25, times the distance from the plate 12 to the edge 33 of the gauge plate 31, divided by the length of the arms 10 and 11 as measured from the plate 12 to the axis of the stud. When, for example, the stud employed has the threads mentioned above having a pitch of .0416 inch, and the edge 33 of the gauge plate is disposed 18¾ inches from the resilient plate 12 on a lower arm 10 which measures 20 inches between the plate 12 and the axis of the stud, the space between the graduations on the plate 31 must be .039 inch.

Adjustment of the present spirit level may be made very quickly and accurately, as will be illustrated by the following problem. Let it be assumed, for example, that a plumber must install a length of piping 132 feet long having a total fall of exactly 15½ inches. Obviously it would be difficult to make this installation accurately and with a uniform pitch throughout the length of piping if it were necessary to establish the pitch by actual lineal measurements. A plumber provided with the present spirit level, however, would immediately divide the fall of 15½ inches by the run of 132 feet and find that the uniform pitch in the piping should be .117 inch per foot of piping. This figure may be set directly upon the present spirit level by threading the adjusting nut 27 upwardly on the stud 25 until the lower edge of the tongue 23 passes the "100" mark on the gauge plate 31 and until the adjusting nut is thereafter brought to a position, all as shown in Fig. 5, where the "17" index mark on the nut is disposed immediately below the indexing mark 37 on the tongue 23. The lock nut 29 may then be threaded downwardly firmly into contact with the upper surface of the resilient tongue 23 and the adjustment just made will then have been secured or locked in position and the spirit level will have been made ready for use in solving this particular problem. When so adjusted, the angular relationship between the arms 10 and 11 of the level will be equal to the angular relationship that should exist between each length of pipe and the horizontal in a piping installation 132 feet long having a total fall of 15½ inches. Thus the plumber may proceed to install each length of pipe, one after another, adjusting the position of each length with the present spirit level so that the bubble 16 is centered in the bubble level 15. When he has thus installed the last length of pipe in the run, the total drop in the piping will be the desired 15½ inches.

The upper bearing surface of the adjusting nut 27 which engages the lower surface of the tongue 23, and the lower bearing surface of the lock nut 29 adapted to engage the upper surface of the tongue, are both normal to the axis of the threaded stud 25. It will thus be understood that, if the tongue 23 were rigid and inflexible, movement of the arms 10 and 11 from their parallel position in the adjustment of the spirit level would cause the adjusting nut 27 and the lock nut 29 to be engageable with the tongue only on an edge of the bearing surface of each nut. In other words, if the tongue were rigid, the upper and lower surfaces of the tongue 23 would lie at an angle to the bearing surfaces of the nuts whenever the arms 10 and 11 were adjusted to form an angle between each other. The flexible nature of the tongue 23, however, avoids this undesirable condition or relationship and thus avoids the error that would be introduced into the readings on the present spirit level if such conditions should exist. When an adjustment of the present spirit level is made as described above, the lock nut 29 is brought firmly down upon the upper surface of the tongue 23 to compress the tongue between the bearing surfaces of the lock nut and adjusting nut. This action causes the tongue to flex slightly so that the outer end of the tongue disposed between the two nuts is caused to assume a position perfectly parallel to the bearing surfaces of the nuts and normal to the axis of the stud 25. In this way a firm seating of the two nuts upon the tongue is accomplished and the error mentioned above is avoided.

If desired, upon completion of a problem the setting on the spirit level may be returned to the zero setting by releasing the lock nut 29 and threading the adjusting nut downwardly. As the adjusting nut 27 moves downwardly, the upper arm 11 will follow because of the tendency of the resilient end plate 12 to maintain the two arms 10 and 11 in parallel relationship. This action will tend to avoid errors in the subsequent adjustment of the level for another problem.

The general arrangement and construction of the present spirit level will be seen to be very rugged and inexpensive but yet very accurate in adjustment. There are no parts employed in the level, such as pivot pins, that would be subject to wear, and it will be noted that the lock nut 29 and the adjusting nut 27, the only parts requiring manipulation, are readily accessible but yet are disposed well within the opposed recesses 21 and 22 where they will be protected from damage.

The foregoing description has been given for clearness of understanding only, and no unnecessary limitations should be implied therefrom, for it will be apparent that various changes may be made in the form and construction of the spirit level without departing from the spirit and scope of the appended claim.

I claim:

A unitary spirit level comprising, a pair of arms mounted longitudinally one above the other with their axes in a common plane, said arms being pivotally joined at adjacent ends and each of said arms having an open recess at its free end, said recesses being located in opposed position relative to each other, a bubble level fixed upon one of said arms, a resiliently flexible indexing tongue fixed at one of its ends to a first one of said arms and extending longitudinally and outwardly with respect thereto through the space provided by said opposed recesses, a threaded shaft fixedly secured at one of its ends to the second one of said arms and extending upwardly in said opposed recesses in fixed position normal to the axis of said second arm and loosely through the free end portion of said tongue, an adjusting nut threadedly mounted on said shaft on one side of said tongue and having a plurality of graduations thereon indexed by said tongue, said adjusting nut being operative upon rotational movement thereof on said shaft to bear upon said tongue to vary the angular relationship between said arms, a lock-nut threadedly mounted on said shaft on the other side of said tongue, said nuts having bearing surfaces thereon normal to the axis of said shaft for simultaneously engaging the upper and lower surfaces of said tongue and for flexing said free end portion of said tongue to a position normal to the axis of said shaft and parallel to the axis of said second arm to avoid errors in the reading of the graduations on said adjusting nut, and a graduated scale fixed upon said second arm and extending upwardly therefrom in position to be swept by the fixed end portion of said tongue during variation of the angular relationship between said arms, the graduations on said scale being multiples of the graduations on said adjusting nut.

References Cited in the file of this patent

UNITED STATES PATENTS

| Number | Name | Date |
|---|---|---|
| 544,677 | Maag | Aug. 20, 1895 |
| 565,096 | Traut | Aug. 4, 1896 |
| 970,897 | Earman | Sept. 20, 1910 |
| 1,817,255 | Hawley | Aug. 4, 1931 |
| 2,138,411 | Tornebohn | Nov. 29, 1938 |
| 2,189,775 | Bleakney | Feb. 13, 1940 |
| 2,206,817 | Mann | July 2, 1940 |
| 2,477,827 | Robinson | Aug. 2, 1949 |

FOREIGN PATENTS

| Number | Country | Date |
|---|---|---|
| 5,157 | Germany | Apr. 21, 1878 |
| 13,075 | Germany | July 20, 1880 |
| 207,233 | Great Britain | May 16, 1923 |
| 480,832 | Great Britain | Mar. 1, 1938 |
| 904,443 | France | Dec. 29, 1943 |